US006753985B1

(12) United States Patent
Kaneko et al.

(10) Patent No.: US 6,753,985 B1
(45) Date of Patent: Jun. 22, 2004

(54) OPTICAL SCANNING DEVICE

(75) Inventors: Koji Kaneko, Saitama (JP); Mitsuhiro Ohno, Saitama (JP)

(73) Assignees: Fuji Photo Optical Co., Ltd., Saitama (JP); Sharp Corporation, Osaka (JP)

( * ) Notice: Subject to any disclaimer, the term of this patent is extended or adjusted under 35 U.S.C. 154(b) by 0 days.

(21) Appl. No.: 09/536,611

(22) Filed: Mar. 28, 2000

(30) Foreign Application Priority Data

Mar. 30, 1999 (JP) ............................................ 11-087867

(51) Int. Cl.[7] .......................... G02B 26/08; H04N 1/40; H04N 1/46
(52) U.S. Cl. ...................... 358/484; 358/471; 358/505; 359/196; 359/205
(58) Field of Search ................................ 358/484, 471, 358/474, 505; 359/295, 206, 293, 196, 197, 205

(56) References Cited

U.S. PATENT DOCUMENTS

| 4,367,912 A | * | 1/1983 | Kitamura ..................... 359/218 |
| 5,404,283 A | * | 4/1995 | Yantz et al. ................. 362/267 |
| 5,673,136 A | * | 9/1997 | Inoue et al. ................. 359/205 |
| 6,195,190 B1 | * | 2/2001 | Tachibe et al. ............. 359/216 |
| 6,256,133 B1 | * | 7/2001 | Suzuki et al. ............... 359/207 |

* cited by examiner

Primary Examiner—Edward Coles
Assistant Examiner—Jason Sherrill
(74) Attorney, Agent, or Firm—Young & Thompson

(57) ABSTRACT

An optical scanning device has an electric motor and a rotary polygon mirror driven by the electric motor which are received in a dust proof chamber equipped with a cooling fin arrangement which 19 Claims, 5 Drawing Sheets

OPTICAL SCANNING DEVICE

BACKGROUND OF THE INVENTION

1. Field of the Invention

The present invention relates to improvements in an optical scanning device for scanning a subject medium.

2. Description of the Related Art

In recent years, with development of digital techniques and light sources, numerous high performance printing equipment and the like have been developed, wherein a light beam modulated according to image signals scans a subject matter, such as photographic pictures and printed matter (which is hereafter referred to as a scanning subject medium), that is sensitive to light to record an image on a paper. In such a printing equipment, the utilization is made of an optical scanning device to scan a scanning subject medium. This optical scanning device is, for typical example, configured such that a laser beam from a laser diode is repeatedly reflected and deflected by a rotary polygon mirror and further directed as a scanning beam to a subject medium through an f-θ lens. Because deflection of the scanning beam by the polygon mirror causes defectiveness in the evenness of velocity of straight line motion of the scanning beam along a canning line on the scanning subject medium relative to a temporal change in rotational angle θ of the polygon mirror, the f-θ lens is employed in order for the optical scanning device to avoid the defectiveness in the evenness of velocity of straight line motion of the scanning beam along a scanning line and keep the velocity of straight line motion of the scanning beam.

In this type of optical scanning device, the polygon mirror that rotates at a speed sufficiently high to cause a current of air therearound stirs up dust and, in consequence, possibly gathers fine dust on its reflective surfaces. If the reflective surface of the polygon mirror gets dust once, the reflective surface causes a scanning beam to scatter or absorbs a scanning beam with the dust, which leads to a basic problem that the scanning beam looses desired accuracy of light intensity and, in consequence, encounters aggravation of precise scanning.

Although this problem is thought to be eliminated by enclosing the polygon mirror in a dust proof chamber, nevertheless, the polygon mirror is hard to be placed alone in the dust proof chamber, and it is necessary to place an electric motor for driving the polygon mirror and its associated parts such as a motor drive circuit and the like. The dust proof chamber encounter a significant rise in ambient temperature due to heat generated rotation of the electric motor and operation of the motor drive circuit, which is always undesirable in light of operational circumstances for the polygon mirror that is a precise optical element that is sensitive to a change in temperature. For example, the polygon mirror causes surface distortion due to a sharp rise in ambient temperature with an adverse effect of aggravation of scanning accuracy.

SUMMARY OF THE INVENTION

It is an object of the present invention to provide an optical scanning device which is accurate in scanning operation.

The foregoing object of the present invention is accomplished by providing an optical scanning device for scanning a subject medium with a light beam that is reflected by a motor driven polygon mirror, which has a dust proof chamber formed in a generally rectangular box-shaped housing for receiving an electric motor and a polygon mirror driven by the electric motor therein and heat releasing means such as a cooling fin arrangement having a plurality of cooling fins for releasing heat within the dust proof chamber.

The interior of the dust proof chamber is preferably connected to the heat releasing means through heat conduction means which may be a heat pipe or a base board with which the cooling fins are integrally formed and which forms at least one of walls of the said dust proof chamber.

An f-θ lens system, which is necessary to implement accurate scanning and usually comprises at least two lens elements, may be installed such that one of the lens elements is directly secured to one of walls of the dust proof chamber excepting the walls that are formed by the base board.

Since the dust proof chamber, which prevents the polygon mirror from getting dust, is thermally connected to the heat releasing means such as a cooling fin arrangement, the interior of the dust proof chamber is kept from a rise in temperature above a certain level. Accordingly, the optical scanning device is prevented from causing inaccurate scanning due to dust adhesion on the polygon mirror and surface distortion of the polygon mirror that is caused by a rise in ambient temperature Many types of heat conduction means, which is well known in various forms and may take any known form, transmits heat in the dust proof chamber efficiently to the heat releasing means, so as to cool effectively the interior of the dust proof chamber.

When enclosing a polygon mirror in the dust proof chamber, it is essential to form an outlet opening for providing an optical path of the scanning beam in one of walls of the duct proof chamber. Although an inlet opening through which the scanning beam enters into the dust proof chamber can be small because the scanning beam does not oscillate, the scanning beam outlet opening has to be wide sufficiently enough to permit oscillation of the scanning beam. Hermetically fitting an f-θ lens or a component lens element of an f-θ lens system in the laser beam outlet opening eliminates a transparent protective glass for closing the laser beam outlet opening, which is always desirable for reducing the number of optical parts and contributory to miniaturization of the optica scanning device.

BRIEF DESCRIPTION OF THE DRAWINGS

The above and other objects and features of the present invention will be more apparent from the following detailed description in connection with a preferred embodiment thereof when reading in conjunction with the accompanying drawings, in which.

DETAILED DESCRIPTION OF THE INVENTION

Figure 1:
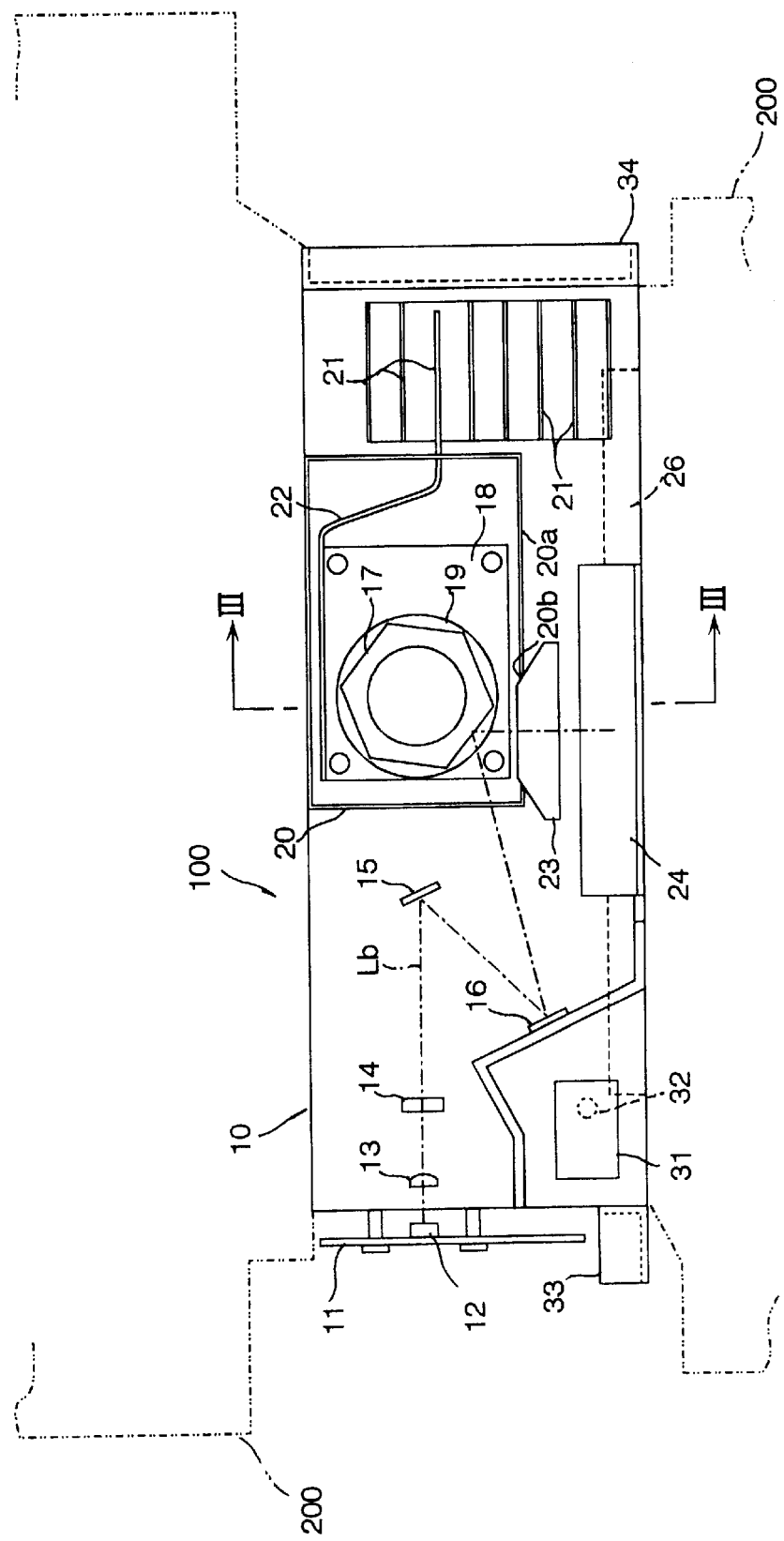
FIG. 1 is a top view of an optical scanning device with a top cover removed away.
Figure 2:
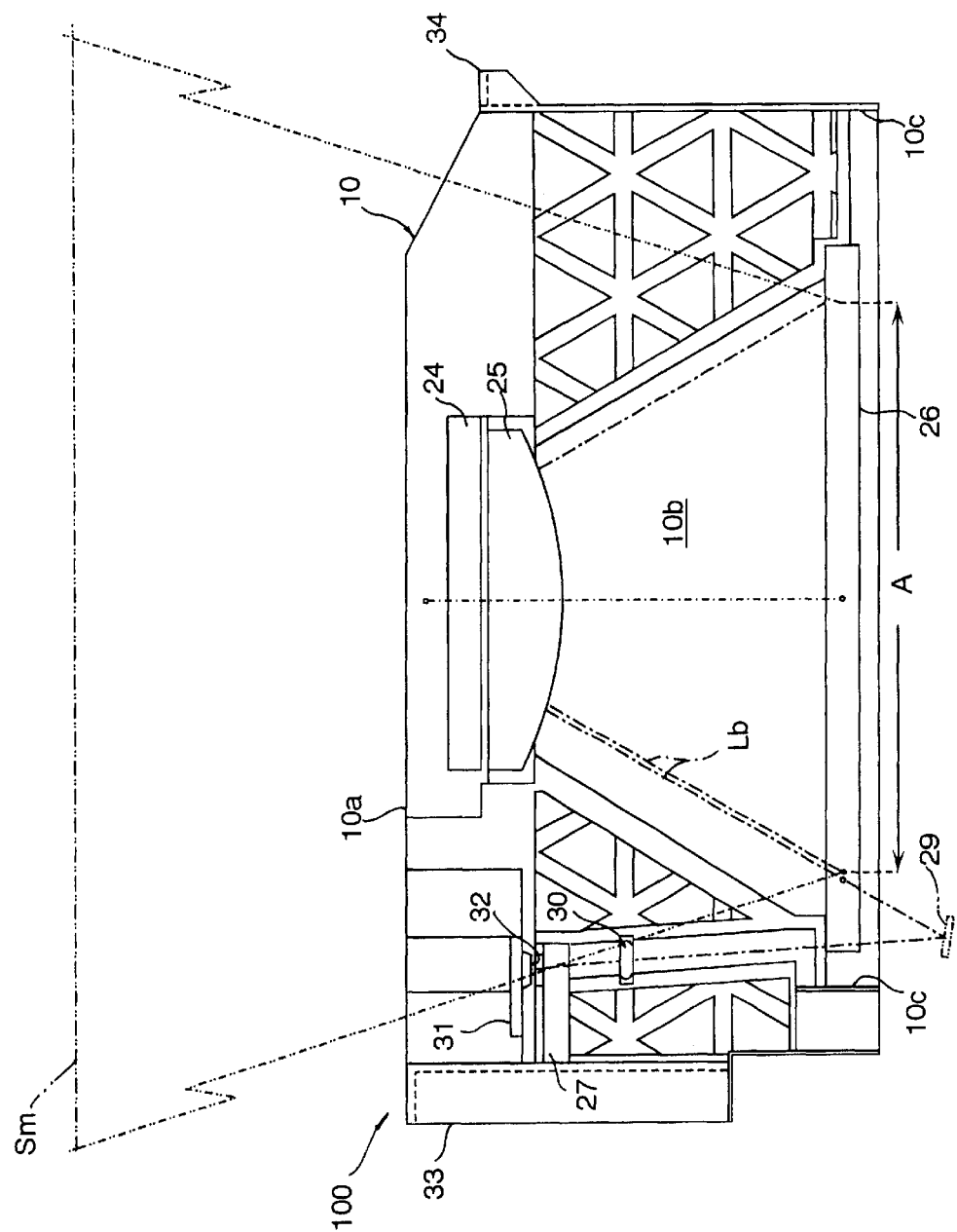
FIG. 2 is a front view of the optical scanning device.
Figure 3:
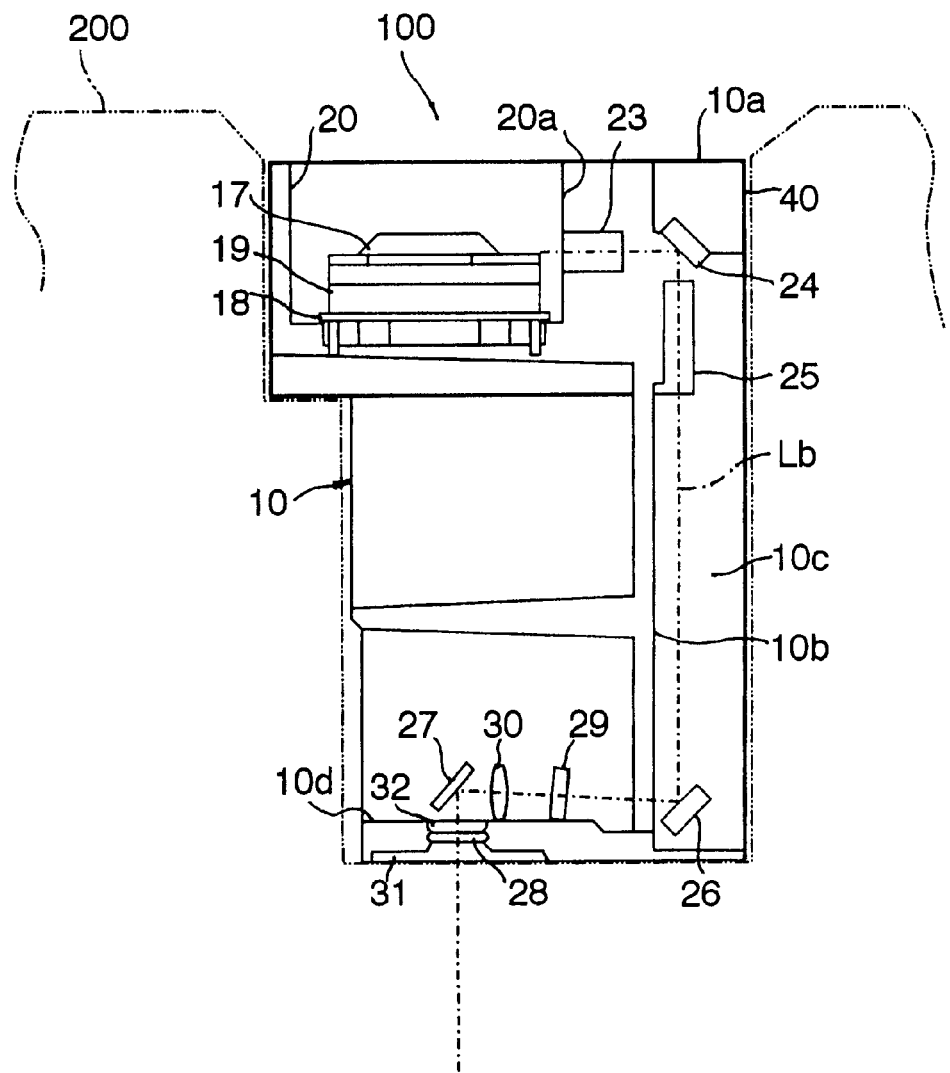
FIG. 3 is a cross-sectional view of FIG. 1 taken along a line III—III.

Referring to the drawings in detail, and in particular to FIGS. 1 to 4 showing an optical scanning device 100 equipped with an f-θ lens system in accordance with a preferred embodiment of the present invention, the optical scanning device 100, which is typically detachably fitted in an acceptance recess of an apparatus such as a printer schematically shown at 200 in FIG. 3 or put between two associated instruments such as another optical scanning device and a printer, has a generally rectangular parallelepiped box-shaped housing (which is hereafter referred to as a box housing for simplicity) 10. The box housing 10 is provided with a detachable cover 40 which has a generally inverse L-shaped form so as to cover the top of the box housing 10 and a rear space defined by the rear wall 10b and extensions of the opposite side walls 10c. The box housing 10 at opposite sides is provided with handles 33 and 34 integrally formed therewith for easy handling. Because the optical scanning device 100 has to provide a space sufficiently large for movement of scanning beam between the optical scanning device 100 and an instrument 200 to which the optical scanning device 100 is installed, the box housing 10 is preferably shaped to have a large width in a scanning direction and a small depth in a direction in which the optical scanning device 100 is installed to the related instrument 200. The optical scanning device 100 has a scanning optical system which comprises a polygon mirror 17, a light beam projection optical system arranged on one side of the polygon mirror 17 close to the laser diode 12, an f-θ lens system arranged on another side of the polygon mirror 17 which is at an angle of approximately right angle with respect to the side facing to the light beam projection optical system, and a scanning timing control optical system. The optical scanning device 100 further has a light source such as laser diode 12 that is mounted a base board 11 of the box housing 10 so as to project a laser beam Lb along an optical path extending zigzag in a horizontal plane.

Figure 4:
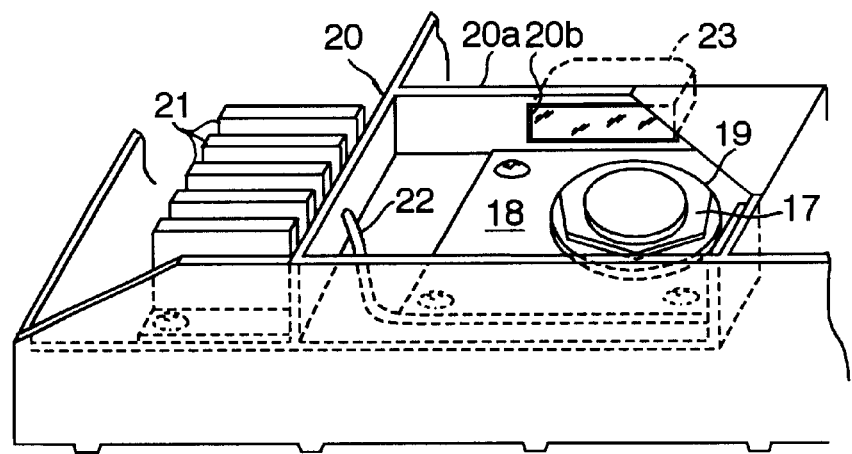
FIG. 4 is a perspective view of a dust proof chamber with a top cover removed away.

The light beam projection optical system comprises collimator lens 13, a cylindrical lens 14 and a pair of reflection mirrors 15 and 16 stationarily arranged in order from the laser diode 12 so as to direct the light beam Lb to the polygon mirror 17. The f-θ lens system comprises a first lens element 23, a first reflection mirror 24, a second lens element 25 and a second reflection mirror 26. The polygon mirror 17 is directly and firmly secured to a rotary shaft (not shown) of an electric motor 19 that is mounted on a base board 18 bolted, or otherwise secured, to the box housing 10 and continuously rotated by the electric motor 19 in a counter-clockwise direction as shown by an arrow in FIG. 1. As is well known in the art, the polygon mirror 17 reflects the laser beam Lb incident thereupon and deflects it toward the f-θ lens element system. The box housing 10 is formed with a dust proof chamber 20 for receiving a polygon mirror unit 150 including the polygon mirror 17 and the electric motor 19 pre-assembled together to the base board 18 therein, so as thereby to keep the polygon mirror 17 from dust. On the top of the base board 18 there are arranged a number of electronic parts forming a control circuit (not shown). Because of installation of the motor and the electronic parts in the interior of the dust proof chamber 20, the dust proof chamber 20 is heated to a somewhat high temperature. On account of a rise in temperature of the dust proof chamber 20, the box housing 10 is integrally formed with, or otherwise provided with, a cooling fin arrangement having a plurality of internal cooling fins 21 arranged in the inside thereof and heat conduction means such as a heat pipe 22 through which the inside of the dust proof chamber 20 is thermally connected to the cooling fin arrangement, so as to cool the inside of the dust proof chamber 20. According to the construction of the dust proof chamber 20, although the electric motor 19 and the electronic parts are sealed within the dust proof chamber 20, the polygon mirror 17 is not only kept from dust but prevented from a rise in temperature with which reflective surfaces of the polygon mirror 17 usually cause distortion .The scanning optical system has an the f-θ lens system comprising two lens elements, i.e. the first lens element 23 and the second lens element 25, the first and second reflection mirrors 24 and 26. The first reflection mirror 24 is disposed in the optical path between the first and second lens elements 23 and 25, and the second reflection mirror 26 is disposed in the optical path after the second lens element 25. Specifically, as seen in FIGS. 3 and 4, the first lens element 23 is directly fitted and secured in a scanning beam outlet opening 20b formed in a vertical side wall 20a of the dust proof chamber 20 and the second lens element 25 is secured to a rear vertical wall 10b of the box housing 10. The first reflection mirror 24 is disposed at an upper corner of the box housing 10 between the top of the box housing 10 where the first lens element 23 is disposed and the side of the box housing at which the second lens element 25 is and positioned right above the second lens element 25 so as to turn downward the optical path at a right angle. The second reflection mirror 26 is disposed at a bottom corner of the box housing 10 between the bottom of the box housing 10 and the rear vertical wall 10b of the box housing 10 to which the second lens element 25 is secured so as to turn back the optical path at a right angle. The laser beam Lb reflected and deflected by the polygon mirror 17 passes first through the first lens element 23 forming another part of the f-θ lens system and then reflected and directed downward at a right angle by the first reflection mirror 24. The laser beam Lb directed downward further passes the second lens element 25 forming another part of the f-θ lens system and travels along the rear vertical wall 10b of the box housing 10 until reaching the second reflection mirror 26. Thereafter, the laser beam 12 is reflected and directed backward to the scanning timing control optical system for synchronization of scanning.

As shown in FIGS. 2 and 3, the scanning timing control optical system comprises a reflection mirrors 27 and 29 disposed behind the second reflection mirror 26, and a relay lens element 30 disposed between the reflection mirrors 27 and 29. The scanning timing control optical system is accompanied by an optical sensor 32 such as a photoelectric element sensor covered by a protective transparent glass 28. The reflection mirror 29 is located on a bottom wall 10d of the box casing 10, and the reflection mirror 27 is located on the bottom wall 10d of the box casing 10 as shown in FIG. 3 but slightly off set sideways from the reflection mirror 29 as shown in FIG. 2. Although the reflection mirror 29 is depicted on a straight path of the laser beam for an easy understanding in FIG. 2, it is actually located behind the second reflection mirror 26 as shown in FIG. 3. The reflection mirror 29 is small in size and located in the box housing 10 so as to receive and reflect back the laser beam Lb that is reflected forward by the second reflection mirror 26 at the very moment that the polygon mirror 17 turns and changes its active reflection surface on which the laser beam Lb directed by the laser beam projection optical system impinges from one to another, in other words, to receive only the laser beam Lb reflected by an extreme end of a given effective range of the reflection mirror 26 that is allowed for line scanning. The laser beam Lb reflected by the extreme end of the second reflection mirror 26 (which is hereafter referred to a synchronous laser beam) is reflected by the reflection mirror 29 and directed back to the second reflection mirror 26. Then the synchronous laser beam Lb is reflected again by the second reflection mirror 26 and directed to the reflection mirror 27 through the relay lens element 30 and further reflected downward by the reflection mirror 27 and directed to the optical sensor 32.The optical sensor 32 covered by the protective glass 28 is secured to a base board 31.

In response to reception of the laser beam Lb, the optical sensor 32 provides a control circuit of a printer that is equipped with the optical scanning device 100 with a synchronous signal for a start or an end of each line scanning of a scanning subject medium Sm.

In operation of the optical scanning device 100 thus constructed, when powering on the optical scanning device 100, directly or indirectly, and exciting the laser diode 12 to generate a laser beam Lb, the optical scanning device 100 is made ready to operate. When the electric motor 19 is actuate, the polygon mirror 17 rotates to continuously and repeatedly reflects the laser beam Lb so as to direct the laser beam Lb to the scanning optical system. The laser beam Lb reflected by the polygon mirror 17 travels through of the scanning optical system having a optical path that is turned. Specifically the laser beam Lb travels passing through the first lens element 23 of the f-θ lens system that is directly secured to the dust proof chamber 20 and is subsequently reflected downward by the first reflection mirror 24 located at the rear top corner and travels along the rear vertical wall 10b of the box housing 10. The laser beam Lb reaches the second reflection mirror 26 located at the rear bottom corner of the box housing 10 and is reflected forward toward the back of the box housing 10. At the very moment that the polygon mirror 17 changes it active reflection surface from one to another, the laser beam Lb is directed to the scanning timing control optical system that is located at the bottom 10c of the box housing 10 behind the second reflection mirror 26 for generating a synchronous signal. Immediately thereafter, the laser beam Lb is directed toward a scanning subject medium Sm placed behind the optical scanning device 100 for synchronized line scanning. While the polygon mirror 17 turns through a regular rotational angle θ, the laser beam Lb moves over the given line scanning range A. At every moment that the polygon mirror 17 changes its active reflection surface from one to another, the optical sensor 32 receives a synchronous laser beam Lb and provides a synchronous signal. While the polygon mirror 17 turns through the regular rotational angle θ, the laser beam Lb moves from one extreme end to the another extreme end of the given line scanning range A for line scanning of the scanning subject medium Sm. With continuous rotation of the polygon mirror 17, the laser beam Lb repeats line movement over the given line scanning range.

As apparent from the above description relating to the optical scanning device in accordance with a preferred embodiment, installation one of the f-θ lens system forming part of the scanning optical system, namely the first lens element 23, directly to one wall of the dust proof chamber 20 for the polygon mirror 17 and the electric motor 19 avoids the necessity of a transparent glass operative to prevent dust from entering the interior of the chamber 20 through the scanning beam outlet opening 20b with an effect of reducing the number of parts and reducing the depth of box housing 10, which is contributory to making the optical scanning device 10 compact in size and reducing costs. The f-θ lens system that has a relatively long optical path length is constructed by arranging separately the two lens elements, one at the rear top corner of the box housing 10 and another at the rear bottom corner of the box housing 10, so as to lay the optical path along the side vertical wall 10c of the box housing 10, as a result of which the optical scanning device 100 is configured significantly compact in overall size. Further, the scanning timing control optical system is laid out to include the second reflection mirror 26 as a part thereof so as to reflect a synchronous laser beam Lb twice by the second reflection mirror 26. This optical structure provides an effect of reducing the number of parts and reducing the depth of box housing 10, which is also contributory to making the optical scanning device 10 compact in size and reducing costs.

Figure 5:
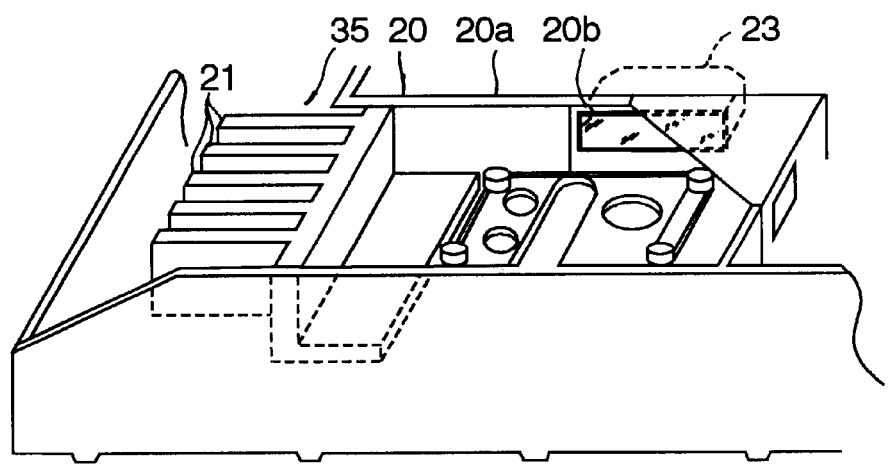
FIG. 5 is a perspective view of a variant of the dust proof chamber with a top cover removed away shown in FIG. 4.

FIG. 5 shows a dust proof chamber 20 accompanied by a different type of cooling fin arrangement in accordance with another embodiment in which the polygon mirror 17, the electric motor 19 and its associated circuit parts are removed away for simplicity. As shown, the cooling fin arrangement has a plurality of cooling fins 21 and a base board 35 to which the cooling fins 21 are secured or which is formed integrally with the cooling fins 21. The base board 35 forms a vertical side wall of the dust proof chamber 20. The dust proof chamber 20 thus constructed transmits heat generated by rotation of the electric motor and operation of the motor drive circuit directly to the cooling fins 21 secured to or integral with the side wall thereof.

Figure 6:
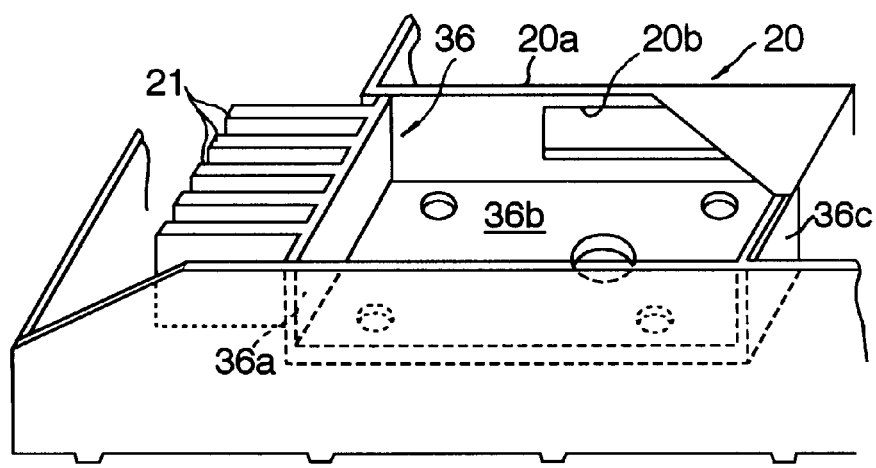
FIG. 6 is a perspective view of another variant of the dust proof chamber with a top cover removed away shown in FIG. 4.

FIG. 6 shows a dust proof chamber 20 accompanied by a different type of cooling fin arrangement in accordance with another preferred embodiment, in which the polygon mirror 17, the electric motor 19 and its associated circuit parts are removed away for simplicity. As shown, the cooling fin arrangement has a plurality of cooling fins 21 and a generally U-shaped base board 36 to which the cooling fins 21 are secured or which is formed integrally with the cooling fins 21. The U-shaped base board 35 forms opposite vertical side walls 36a and 36b and a bottom wall 36c of the dust proof chamber 20. The dust proof chamber 20 thus constructed absorbs and transmits heat generated by rotation of the electric motor and operation of the motor drive circuit to the cooling fins 21 through the side walls 36a and 39b and the bottom wall 36c thereof. Since the base board 36 of this embodiment has an area available for absorbing heat significantly larger than the base board 35 of the previous embodiment shown in FIG. 5, the dust proof chamber 20 provides improvement of cooling efficiency.

The dust proof chamber 20 accompanied by a heat pipe 22 such as shown in FIG. 4 is allowed to incorporate desired sizes of cooling fines and lay out them in desired positions and accordingly provides far more improved cooling efficiency as compared with the dust proof chambers 20 shown in FIGS. 5 and 6.

As apparent from the above description, the optical scanning device of the invention prevents the polygon mirror from getting dust on its reflection surfaces and a rise in temperature thereof.

It is to be understood that although the present invention has been fully described by way of the preferred embodiments thereof with reference to the accompanying drawings, various variant and other embodiments may occur to those skilled in the art. Unless these variants and embodiment depart from the scope of the present invention, they are intended to be covered by the following claims.

What is claimed is:

1. An optical scanning device for scanning a subject medium with a light beam that is reflected by a polygon mirror driven by an electric motor, said optical scanning device comprising:

a generally rectangular box-shaped housing; and a dust proof chamber formed in said generally rectangular box-shaped housing for receiving an electric motor and a polygon mirror that is driven by said electric motor therein;

a means for generating laser light separated from the dust proof chamber; and a cooling fin arrangement having a plurality of cooling fins for cooling an interior of the dust proof chamber and disposed immediately adjacent the dust proof chamber.

2. An optical scanning device as defined in claim 1, and further comprising heat conduction means for connecting said interior of said dust proof chamber and said cooling fin arrangement.

3. An optical scanning device as defined in claim 2, wherein said heat conduction means comprises a heat pipe.

4. An optical scanning device as defined in claim 2, wherein said heat conduction means comprises a base board with which said cooling fins are integrally formed and forms at least one of walls of said dust proof chamber.

5. An optical scanning device as defined in claim 4, wherein said base board forms a vertical side wall of said dust proof chamber.

6. An optical scanning device as defined in claim 4, wherein said base board forms vertical side walls opposite to each other and a bottom wall between said vertical side walls of said dust proof chamber.

7. An optical scanning device as defined in claim 2, and further comprising an f-θ lens system comprising at least two lens element for continuously varying movement of said scanning beam relative to a regular angle of rotation of said polygon mirror so as to scan over said subject medium at an even speed, wherein one of said lens elements is directly secured in a scanning beam outlet opening formed in one of walls of said dust proof chamber excepting said walls that said base board forms.

8. An optical scanning device for scanning a subject medium with a light beam that is reflected by a polygon mirror driven by an electric motor, said optical scanning device comprising:

a generally rectangular box-shaped housing;

a dust proof chamber arranged in said generally rectangular box-shaped housing;

an electric motor and a polygon mirror that is driven by said electric motor disposed within the dust proof chamber; and means for cooling an interior of the dust proof chamber.

9. The optical scanning device of claim 8, wherein the means for cooling the interior of the dust proof chamber comprises cooling fins arranged immediately adjacent the dust proof chamber.

10. The optical scanning device of claim 9, further comprising a means for generating laser light disposed away from the dust proof chamber.

11. The optical scanning device of claim 10, wherein the means for generating laser light is positioned to a side of the dust proof chamber opposite the means for cooling the interior of the dust proof chamber.

12. An optical scanning device as defined in claim 9, and further comprising heat conduction means for connecting said interior of said dust proof chamber and said cooling fin arrangement.

13. An optical scanning device as defined in claim 12, wherein said heat conduction means comprises a heat pipe.

14. An optical scanning device as defined in claim 12, wherein said heat conduction means comprises a base board with which said cooling fins are integrally formed and forms at least one of walls of said dust proof chamber.

15. An optical scanning device as defined in claim 14, wherein said base board forms a vertical side wall of said dust proof chamber.

16. An optical scanning device as defined in claim 11, and further comprising heat conduction means for connecting said interior of said dust proof chamber and said cooling fin arrangement.

17. An optical scanning device as defined in claim 16, wherein said heat conduction means comprises a heat pipe.

18. An optical scanning device as defined in claim 16, wherein said heat conduction means comprises a base board with which said cooling fins are integrally formed and forms at least one of walls of said dust proof chamber.

19. An optical scanning device as defined in claim 18, wherein said base board forms a vertical side wall of said dust proof chamber.

* * * * *